Feb. 5, 1963 K. B. KEELING, SR Re. 25,326

REMOVABLE DOOR STRUCTURE

Original Filed Nov. 21, 1958 2 Sheets-Sheet 1

INVENTOR.
KERMIT B. KEELING, SR.

BY T G Dysart

HIS ATTORNEY

REMOVABLE DOOR STRUCTURE

Original Filed Nov. 21, 1958 2 Sheets-Sheet 2

INVENTOR.
KERMIT B. KEELING, SR.
BY T. G. Dysart
HIS ATTORNEY

United States Patent Office

Re. 25,326
Reissued Feb. 5, 1963

25,326
REMOVABLE DOOR STRUCTURE

Kermit B. Keeling, Sr., Louisville, Ky., assignor to General Electric Company, a corporation of New York Original No. 3,006,335, dated Oct. 31, 1961, Ser. No. 775,458, Nov. 21, 1958. Application for reissue Feb. 14, 1962, Ser. No. 173,864
7 Claims. (Cl. 126—191)

Matter enclosed in heavy brackets [ ] appears in the original patent but forms no part of this reissue specification; matter printed in italics indicates the additions made by reissue.

This invention relates to removable door structures and has as its general object the provision of an improved door hinge mounting arrangement whereby an oven door, for example, may be mounted for pivotal movement between open and closed positions and also easily released and removed from the oven body so as to provide easy access to the interior of the oven for cleaning and other purposes.

Further objects and advantages of the invention will become apparent as the following description proceeds, and the features of novelty which characterize the invention will be pointed out with particularity in the claims annexed to and forming a part of this specification.

Briefly stated, in accordance with one aspect of this invention there is provided an oven door hinge structure including supporting members secured to the door and arranged to engage pivotally mounted hinge members secured to the oven body, and manually movable stop elements mounted on the hinge members for movement between one position in engagement with stop formations secured to the oven body when the hinge members are in open position and a second position out of engagement with the stop formations and preferably in engagement with portions of the door. Thus the door may be removed from the oven body only in its open position, and in this position the hinge members are locked so that they will remain ready to receive the door when it is replaced.

For a better understanding of this invention, reference may be made to the following description and the following drawings in which.

Figure 1:
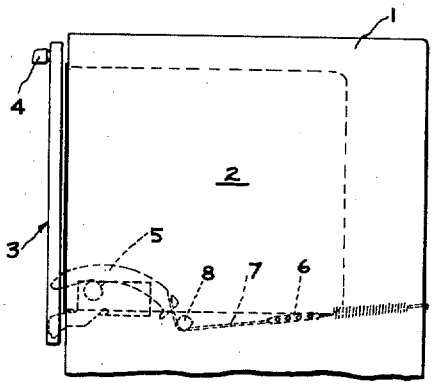
FIG. 1 is a fragmentary view, in elevation, of a cooking range embodying the present invention.

Referring to the drawing, reference numeral 1 designates a range body including an oven liner 1a enclosing an oven 2 having a front opening, an oven door 3 provided with a handle 4 adapted to close the front opening of oven 2, hinge structure shown in detail in FIGS. 2–7 including a hinge lever 5 secured to door 3 by means hereinafter described in detail, and a spring 6 connected to range body 1 and to one end of hinge lever 5 by means of a cable 7 passing under a pulley 8 so as to apply a force to door 3 biasing it toward its closed position.

Figure 4:
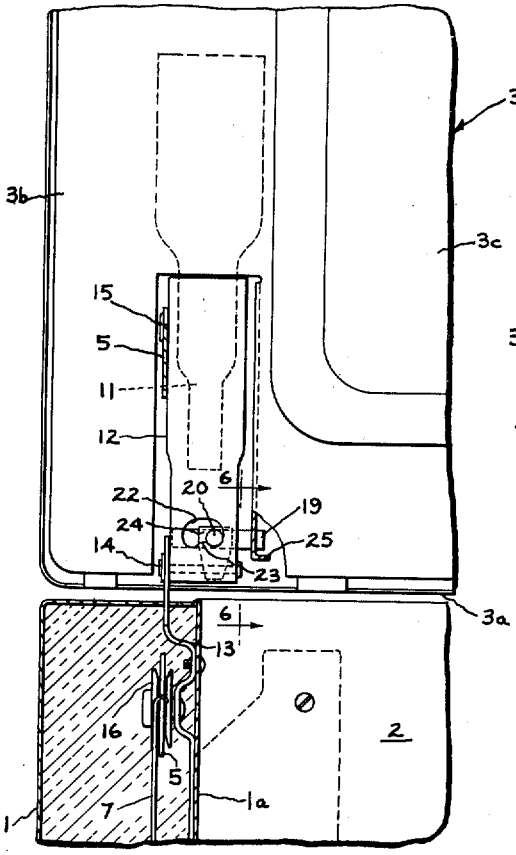
FIG. 4 is a cross-sectional view taken along the line 4—4 in FIG. 3.
Figure 6:
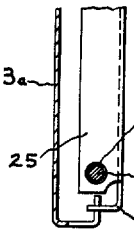
FIG. 6 is a sectional view taken along the line 6—6 in FIG. 4.
Figure 6:
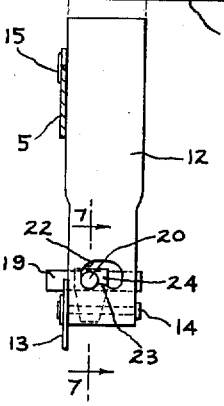
Figure 7:
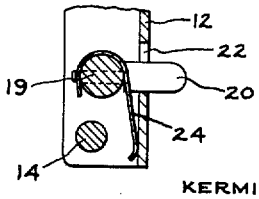
FIG. 7 is a sectional view taken along the line 7—7 in FIG. 5.
Figure 2:
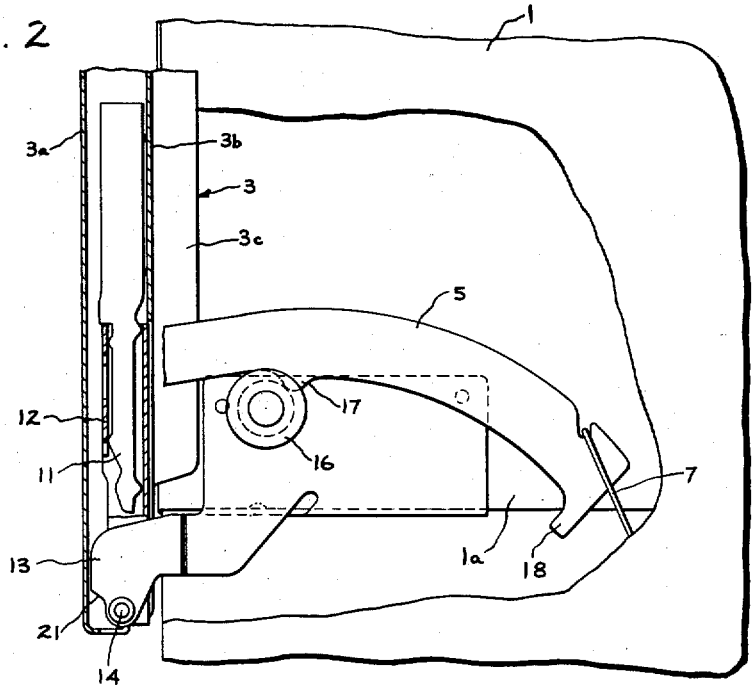
FIG. 2 is an enlarged fragmentary view, with some of the parts broken away, of the door hinge structure utilized in the range shown in FIG. 1.
Figure 3:
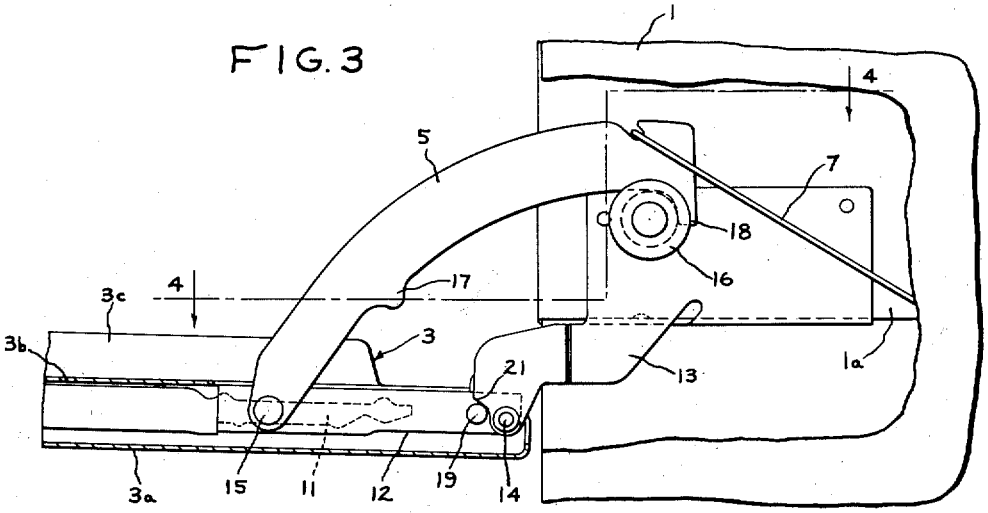
FIG. 3 is similar to FIG. 2 but shows the parts as they appear when the oven door is in its fully open position.

As shown in FIGS. 2–4, door 3 is secured to range body 1 along its lower edge, preferably by a pair of hinge mechanisms adapted to provide movement between a closed position, a partially open position, and a fully open position. Door 3, which includes an outer panel 3a and an inner panel 3b having a raised central portion 3c to provide greater thickness for insulating purposes, is provided adjacent each side edge thereof with a projecting door supporting member 11 rigidly secured thereto by any suitable means, and arranged to engage and be supported in a box-like hinge member 12 which is pivotally secured to a hinge member 13 by means of a hinge pin 14, hinge member 13 being fixedly secured to oven body 1 by screws or other suitable means. Hinge lever 5 is pivotally mounted at one end thereof on hinge member 12 by means of a pivot pin 15, so that when door 3 is mounted on the open body as shown in FIGS. 2 and 3, spring 6 applies a force to the door tending to return it from the open position shown in FIG. 3 to the closed position shown in FIG. 2. The lower edge of hinge lever 5 rides on a roller 16 mounted on hinge member 13, it being observed that this edge is smoothly curved with the exception of a protuberance 17 intermediate the ends thereof and a stop portion 18 on the free end thereof, the latter being arranged to engage roller 16 so as to support door 3 in the fully open position. Protuberance 17 is positioned so as to hold door 3 by means of engagement with roller 16 in a partially open position useful in broiling operations. However, it will be understood that this feature is not a necessary part of the present invention.

In order to provide convenient access to the interior of the oven for cleaning and other purposes, it has been found to be desirable to provide means for removing door 3 from oven body 1 and thus projecting support member 11 on the door and hinge member 12 which is pivotally mounted on the oven body are arranged so that they may be separated from each other. It is apparent that door 3 cannot be conveniently removed from the oven body when in its closed position; furthermore, built-in ovens of the type arranged to be mounted in the wall of a kitchen or the like which have become popular in recent years are generally mounted at waist height, and the doors of such ovens can be conveniently removed by the housewife only when it is in its fully open or horizontal position. It will also be understood that a spring force of substantial magnitude is acting on hinge member 12 when it is in the fully open position and that it would be returned to its closed position at great speed if the door were simply pulled from the oven body in any fully open or partially open position. Also, when door 3 is held in any partially open position the frictional forces between projecting support member 11 and hinge member 12 produced by the closing force of spring 6 make removal of the door difficult if not practically impossible.

Figure 5:
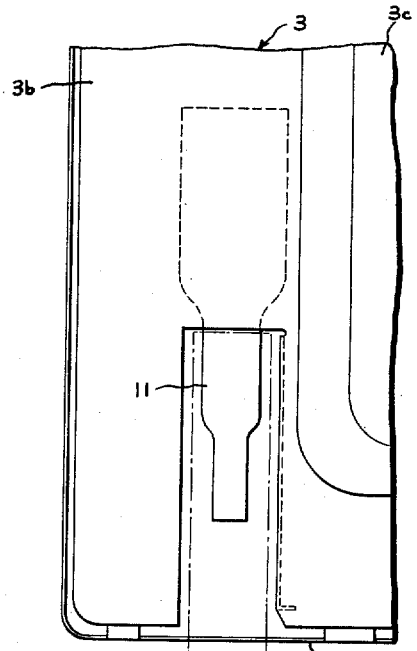
FIG. 5 is a fragmentary view similar to FIG. 4, in which the door is shown removed from its hinge structure.

In accordance with the present invention, I provide simple and inexpensive means for locking hinge member 12 in its fully open position so that it remains in its open position whenever it is desired to remove the door for cleaning or other purposes. As best shown in FIGS. 4 and 5, a sliding stop element comprising a locking pin 19 and a handle portion 20 is mounted on hinge member 12 and arranged to cooperate with a stop formation 21 (see FIG. 3) fixedly secured to oven body 1. Stop formation 21 may conveniently be formed on one edge of hinge member 13 adjacent the opening therein which carries hinge pin 14. As seen in FIG. 4, locking pin 19 is movable from a position in which its left end is wholly within hinge member 12 and thus out of engagement with stop formation 21 and another position extending to the left in which it underlies stop formation 21 and thus prevents movement of hinge member 12 to its closed position. Handle portion 20 extends through an elongated opening 22 in the wall of box-like member hinge member 12 which is uppermost when the door is in its open position so that it may be manually actuated between its locked and unlocked positions when the door 3 is fully open. Preferably, elongated opening 22 includes a protuberance 23 positioned to provide a positioning recess for handle portion 20 at each end of the opening and the locking pin 19 is provided with spring means such as a leaf spring 24 arranged to bias handle 20 against the marginal edge of opening 22 of which protuberance 23 is a part. Thus handle 20 must be shifted so as to rotate locking pin 19 slightly to disengage the handle from protuberance 23 whenever the locking pin is to be shifted from one position to the other.

While the frictional forces between support member 11 and hinge member 12 may be sufficient to prevent inadvertent removal of door 3 from the oven body, it is desirable that a positive locking arrangement be provided, and as shown in FIG. 4 locking pin 19 is preferably arranged to serve this purpose as well as the purpose described above. Thus, locking pin 19 may be made sufficiently long so that its right end (as viewed in FIG. 4) extends into engagement with an adjacent portion 25 of door 3 when the left end of the locking pin is out of engagement with stop formation 21. Preferably portion 25 of the door includes an aperture 26 positioned in alignment with the path of movement of locking pin 19 so that the right end of the locking pin extends therethrough when in the position shown in FIG. 4.

While it is conceivable that a single hinge mechanism might be utilized to support a door in some applications, an arrangement including a pair of hinge mechanisms disposed on opposite sides of the door is usually desirable. In the latter arrangement it is of course necessary to utilize the present invention in each hinge mechanism unless one of the hinge mechanisms is not spring biased to the closed position. In structures in which two hinge mechanisms are utilized, locking pin 19 performs an additional function if an attempt is made to remove the door when the locking pin of one of the hinge mechanisms remains in the normal operation (FIG. 4) position, or is entirely absent. Under these circumstances a single locking pin remains in engagement with the door, and even though the door would tend to dis-engage the other hinge mechanism (twisting in its own plane about the first hinge) it will be seen (see FIG. 4) that the locking pin of the first hinge interferes with such movement of the door, and prevents movement sufficient to allow the door to be completely dis-engaged while the first hinge mechanism remains in its normal operation (unlocked) position, in which position it would be propelled by spring force against the oven body if the dor could be completely removed.

From the foregoing it will be evident that I havt provided a removable oven door hinge arrangement including a simple and inexpensive but effective locking means for supporting the door hinge members in the open position when removal of the door is desired, and also for positively securing the door to the hinge members during normal operation of the door.

While I have shown and described a particular embodiment of my invention, I do not desire the invention to be limited to the particular construction disclosed, and I intend by the appended claims to cover all modifications within the true spirit and scope of my invention.

What I claim is:

1. A removable door structure, a body having a vertical wall with a door opening therein, a pivoted door adapted to close said opening, a pair of first hinge means rigidly secured to said body at the bottom edge of said opening, a pair of second hinge means pivotally secured to said first hinge means respectively, a pair of door supporting members secured to said door and arranged to removably engage said pair of second hinge means respectively, said door being swingable between a vertical closed position and a horizontal fully open position, and a manually movable stop element mounted on at least one of said second hinge means for alternate movement between two positions, a first position in locking engagement with the related first hinge means when the door and said second hinge are in substantially the fully open position, and a second position out of locking engagement with the said related first hinge means but into locking engagement with the door, whereby said door is normally locked to the second hinge means and may only be fully removed from said body when said door is in the substantially fully open position and said stop element is in its said first position in locking engagement with the related first hinge means.

2. A removable door structure, a body having a vertical wall with a door opening therein, a pivoted door adapted to close said opening, a pair of first hinge members rigidly secured to said body at the bottom edge of said opening, a pair of second hinge members pivotally secured to said first hinge member respectively, a pair of door supporting members secured to said door and arranged to removably engage said pair of second hinge members for movement therewith, spring means for applying a force to at least one of said second hinge members to bias said door toward its closed position, and a manually movable stop element mounted on the second hinge member that is acted upon by the said spring means, said stop element having alternate movement between two positions, a first position in locking engagement with the related first hinge member when the door and said second hinge member are in a substantially fully open position so as to lock said second hinge member in said open position against the bias of said spring means, and a second position out of locking engagement with the first hinge member but into locking engagement with the door so that the door may be pivoted closed, whereby said door may only be removed from said body when said door is in the substantially fully open position and said stop element is unlocked from the door and in its said first position.

3. A removable door structure as recited in claim 2 in which the said body is an oven body and said stop element comprises a locking pin mounted for movement along a path generally parallel to the pivotal axis of its related second hinge member, and a handle portion projecting from said locking pin so as to extend upwardly when the door and said second hinge member are in the substantially fully open position.

4. A removable door structure for an oven body as recited in claim 3 in which said second hinge member that is acted upon by the said spring means includes a hollow box-like member having an elongated opening in a wall thereof which is uppermost when in said open position, and said handle portion extends through said opening.

5. A removable door structure for an oven body as recited in claim 4 in which a marginal portion of the wall defining one side of said opening for the handle of the stop element includes a protuberance positioned so as to provide a positioning recess for said handle portion at each end of said opening, and spring means biasing said handle portion of said stop element against said marginal portion of said opening.

*6. A removable door structure comprising a body having a vertical wall with a door opening therein, a pivoted door adapted to close said opening, a first pair of hinge members rigidly secured to said body at a bottom edge of said opening, a second pair of hinge members pivotally secured to said first pair of hinge members and adapted to removably support said door for movement between a vertical closed position and a horizontal fully open position, means for applying a force to at least one of said second pair of hinge members biasing said door towards its closed position, door supporting members secured to said door and arranged to removably engage said second pair of hinge members for movement therewith, and a manually movable stop element mounted on at least one of said second pair of hinge members, a stop formation fixedly mounted with respect to the body, the stop ele-*

*ment having alternate movement between a first position in engagement with the said stop formation when the door is in its fully open position so as to lock its supporting hinge member in said open position against the bias of said force applying means and a second position out of engagement with said stop formation so that the door may be closed, whereby said second hinge member may be locked in said open position to permit removal of said door from said oven body, said stop element comprising a locking pin mounted for movement along a path generally parallel to the pivotal axis of said hinge members, and a handle portion projecting from said pin so as to extend upwardly when said door is in its fully open position, at least one of said second hinge members including a hollow box-like member having an elongated opening in the wall thereof which is uppermost when the door is in said open position, and said handle portion extends through said opening for ease of manipulation.*

*7. A removable door structure as defined in claim 6 in which the marginal portion of said wall defining one side of said elongated opening includes a central protuberance positioned so as to provide a positioning recess for said handle portion at each end of said opening, and spring means biasing said handle portion of said stop element against said marginal portion of said opening.*

References Cited in the file of this patent
or the original patent

UNITED STATES PATENTS

| | | |
|---|---|---|
| 1,979,210 | Rogers | Oct. 30, 1934 |
| 2,594,533 | Baker | Apr. 29, 1952 |
| 2,721,547 | Polluck | Oct. 25, 1955 |
| 2,873,737 | Sherman | Feb. 17, 1959 |
| 2,917,040 | Aten | Dec. 15, 1959 |
| 2,934,059 | Baker | Aug. 26, 1960 |